United States Patent [19]

Komakine

[11] Patent Number: 4,499,944
[45] Date of Patent: Feb. 19, 1985

[54] HEAT EXCHANGERS INSTALLED IN FLUIDIZED BEDS

[75] Inventor: Takashi Komakine, Kawaguchi, Japan

[73] Assignee: Tokyo Shibaura Denki Kabushiki Kaisha, Kanagawa, Japan

[21] Appl. No.: 466,945

[22] Filed: Feb. 16, 1983

[30] Foreign Application Priority Data

| Feb. 18, 1982 [JP] | Japan | 57-24929 |
| Jun. 29, 1982 [JP] | Japan | 57-110797 |
| Aug. 11, 1982 [JP] | Japan | 57-138570 |

[51] Int. Cl.³ .......................... F28C 3/16; F28D 13/00
[52] U.S. Cl. ................................ 165/104.16; 122/4 D; 422/146
[58] Field of Search .............. 165/104.16; 122/4 D; 422/146

[56] References Cited

U.S. PATENT DOCUMENTS

| 2,884,373 | 4/1959 | Bailey | 208/132 |
| 3,696,793 | 10/1972 | Bell | 122/4 D |
| 3,912,002 | 10/1975 | Elliott | 165/104 |
| 4,096,909 | 6/1978 | Jukkola | 165/104.16 |
| 4,274,478 | 6/1981 | Stendahl | 165/104 |
| 4,343,352 | 8/1982 | Bockman et al. | 165/104.16 |

FOREIGN PATENT DOCUMENTS

| 1205565 | 6/1966 | Fed. Rep. of Germany . | |
| 2905725 | 8/1980 | Fed. Rep. of Germany | 122/4 D |
| 87675 | 7/1979 | Japan . | |
| WO80/2193 | 10/1980 | PCT Int'l Appl. | 165/104.16 |
| 927660 | 5/1963 | United Kingdom | 122/4 D |
| 2065493 | 7/1981 | United Kingdom . | |

Primary Examiner—Albert W. Davis, Jr.
Attorney, Agent, or Firm—Schwartz, Jeffery, Schwaab, Mack, Blumenthal & Koch

[57] ABSTRACT

A heat exchanger including a serpentine heat transfer tube embedded in a fluidized bed contained in a vertical casing. The heat transfer pipe has a construction such that fluid undergoing heat exchange and particles of the fluidized bed do not move straightforwardly from an inlet port at the bottom of the casing toward an exit port at the top of the casing. The heat transfer tube includes a horizontal portion extending through a vacant space in the vertical casing above the fluidized bed, and this horizontal portion is provided with a plurality of spaced inclined fins which overlap with each other when viewed from above.

5 Claims, 8 Drawing Figures

HEAT EXCHANGERS INSTALLED IN FLUIDIZED BEDS

BACKGROUND OF THE INVENTION

This invention relates to a heat exchanger installed in a fluidized bed.

To effect heat exchange between a hot (or cold) fluid and another fluid, a fluidized bed type heat exchanger is generally used in which one or more heat transfer pipes are embedded in a fluidized bed consisting of numerous particles accumulated on a perforated distributing plate at the bottom of the fluidized bed. Thus heat is transferred to the second fluid through the particles and the walls of the heat transfer pipes. Usually, the particles are made of any heat resistant material such as silica, alumina and glass having a particle size of 0.1 to 2 or 3 mm. To ensure high heat transfer between the hot fluid and the heat transfer pipe in a limited space, it is necessary to increase the contact area between the fluid and the heat transfer pipe. To this end it has been the practice to provide fins for the heat transfer pipes.

FIG. 1 shows one example of a prior art heat exchanger installed in a fluidized bed, which comprises a vertical cylindrical casing 3 having a circular or rectangular cross-section and inlet and exit ports 1 and 2 at both ends for a hot fluid, in this example hot gas, a perforated distribution plate 4 at the bottom and a fluidized bed 6 constituted by numerous fluidizable particles 5 are formed on the distribution plate 4, and a serpentine heat transfer pipe 8 embedded in the fluidized bed 6 and provided with a plurality of fins 7. Although in this example turns of serpentine pipe 8 are parallel with each other, this arrangement is not material to this invention. The fins usually made of thin sheets of heat conductive material, copper or aluminum, and have a thickness of about 1 mm or less.

Fluid to be heated is admitted into the heat transfer pipe 8 through an inlet port 9, heated by the hot gas and then issues through an outlet port 10.

The hot gas passing through the perforations of the distribution plate 4 rises upwardly through the interstices between the particles in spaces between adjacent fins 7 in the form of small bubbles. Such bubbles combine into larger bubbles B (see FIG. 2) which prevent intimate contact between the particles 5 and the fins 7 and the pipe 8, thus decreasing the quantity of heat transferred therebetween. As the size of the gas bubble increases it prevents contact between the particles and the fins as shown in the left upper portion of FIG. 2. Although this phenomenon does not occur uniformly throughout the fluidized bed, once it occurs it decreases the flow resistance against gas flow so that the gas can readily flow through the spaces between the fins containing such large gas bubbles, whereby the gas flow becomes nonuniform thus decreasing heat transfer. In other words, the fins provided for the purpose of increasing the heat transfer area cause an adverse effect.

In a certain case, a heat exchanger installed in a fluidized bed is not provided with fins, and turns of the serpentine heat transfer pipe extend in the horizontal direction and are aligned in the vertical direction. With such construction, the particles are moved along both sides of the pipe to transfer heat. Accordingly, in order to increase the capacity of the heat exchanger it is necessary to increase the number of the horizontal turns of the heat transfer pipe, and hence the height thereof, thus increasing the flow resistance to the hot gas (or liquid).

On the other hand, when the width of the heat exchanger is increased, uniform flow of the hot gas becomes difficult, meaning non-uniform flow of the particles as well as lowering of heat transfer efficiency. Furthermore, the particles are moved along both sides of the heat transfer tube but not in the longitudinal direction thereof.

At the upper surface of the fluidized bed, since the flow resistance of the particles to the flow of hot gas dissappears, the gas bubbles forcefully rupture to cause the particles on the upper surface of the bed to fly upwardly. When the hot fluid comprises liquid, it entrains the particles. In any case, a portion of the particles is carried to the outside of the heat exchanger requiring frequent replenishment of the particles.

SUMMARY OF THE INVENTION

It is therefore an object of this invention to provide an improved heat exchanger installed in a fluidized bed capable of preventing formation of large gas bubbles.

Another object of this invention is to provide a heat exchanger provided with fins and installed in a fluidized bed that prevents straightforward flow of gas or liquid in spaces between the fins thus improving heat transfer efficiency and enabling a reduction in size of the heat exchanger.

Still another object of this invention is to provide a novel heat exchanger installed in a fluidized bed capable of embedding many more turns of the heat transfer pipe in a fluidized bed of definite height or depth, and capable of causing the particles to move also in the axial direction of the turns of the heat transfer tube.

Yet another object of this invention is to provide a heat exchanger installed in a fluidized bed capable of uniformly moving the particles so as to improve heat transfer efficiency.

A further object of this invention is to provide a novel heat exchanger installed in a fluidized bed capable of preventing escape of the particles to the outside of the heat exchanger.

According to this invention, there is provided a heat exchanger comprising a vertical casing having a lower fluid inlet port and an upper fluid exit port, a fluidized bed formed on a perforated distribution plate positioned in the casing above the inlet port, and a serpentine heat transfer pipe means embedded in the fluidized bed, and traversed by another fluid to be heated or cooled by the first mentioned fluid, the heat transfer pipe means having a construction such that the first mentioned fluid and particles of the fluidized bed do not move straightforwardly from the inlet port toward the exit port and said heat transfer pipe means comprising a horizontal portion connected in series with a portion thereof embedded in said fluidized bed and extending through a vacant space in said vertical casing above said fluidized bed, said horizontal portion being provided with a plurality of spaced inclined fins which overlap with each other when viewed from above.

DESCRIPTION OF THE PREFERRED EMBODIMENTS

Figure 1:
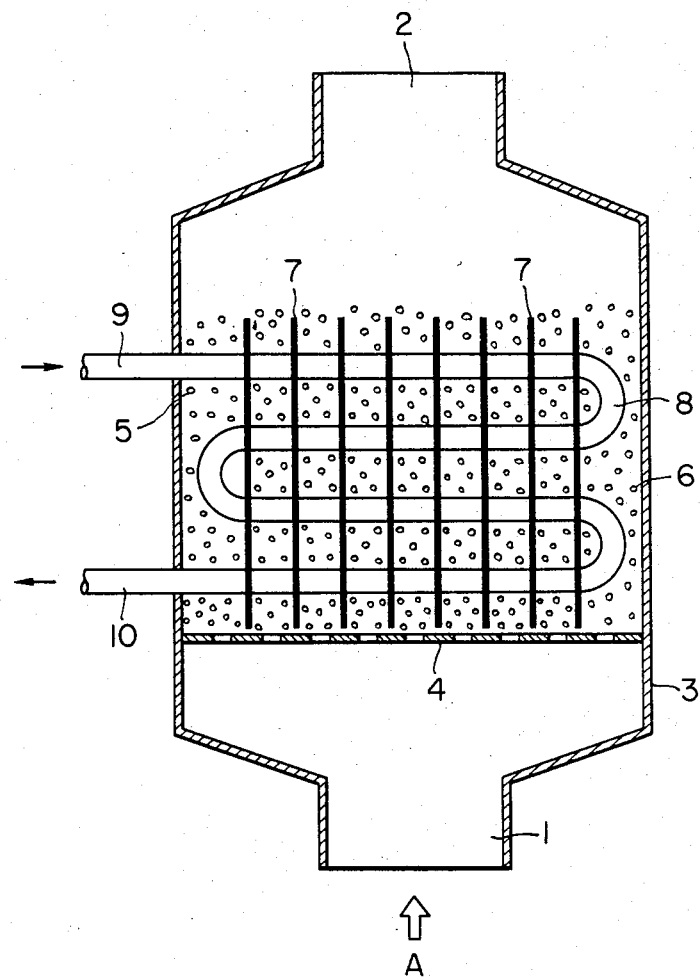
FIG. 1 is a longitudinal sectional view showing a prior art heat exchanger provided with fins and installed in a fluidized bed.
Figure 2:
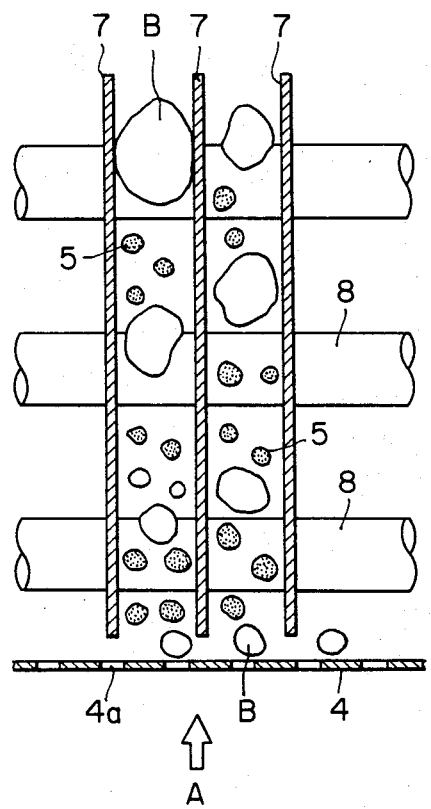
FIG. 2 is an enlarged view showing gas bubbles formed in the spaces between the fins of the heat exchanger shown in FIG. 1.
Figure 3:
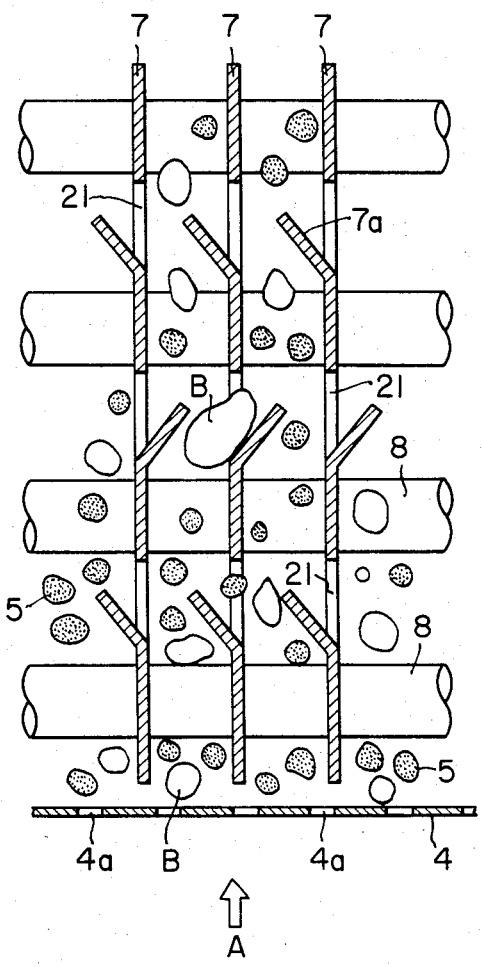
FIG. 3 is an enlarged view corresponding to FIG. 2 and showing improved fins according to this invention.

In a preferred embodiment shown in FIG. 3 elements identical to those shown in FIGS. 1 and 2 are designated by the same reference characters.

As pointed out above one of the features of this invention lies in that the heat transfer pipe or fins disposed in the fluidized bed are constructed such that gas or liquid and particles do not move straightforwardly in the axial direction of the heat exchanger or casing thereof.

According to the embodiment shown in FIG. 3, each fin 7 is provided with inclined stamped out pieces 7a which are alternately inclined in the opposite directions. Accordingly, the hot gas bubbles 8 and particles 5 flow upwardly in spaces between adjacent fins. However, due to the inclined stamped out pieces 7a and openings 21 through the fins, they do not flow straightforwardly, that is in the axial direction of the heat exchanger, or in parallel with the fins. More particularly, the gas bubbles collide against the pieces 7a or pass through the openings 21 so that the gas bubbles are broken into small bubbles, thus obviating the problem caused by large bubbles. The particles are moved in the same manner to increase the chance of collision against the fins 7 and their stamped out pieces 7a thus increasing the efficiency of heat transfer. In other words, the gas bubbles and particles move along complicated paths, that is three dimensionally.

When hot or cold liquid is used instead of hot gas, although the problem of large gas bubbles does not occur, the liquid and particles flow through complicated paths so that the same heat transfer effect can be realized in just the same manner as in hot gas.

Figure 4:
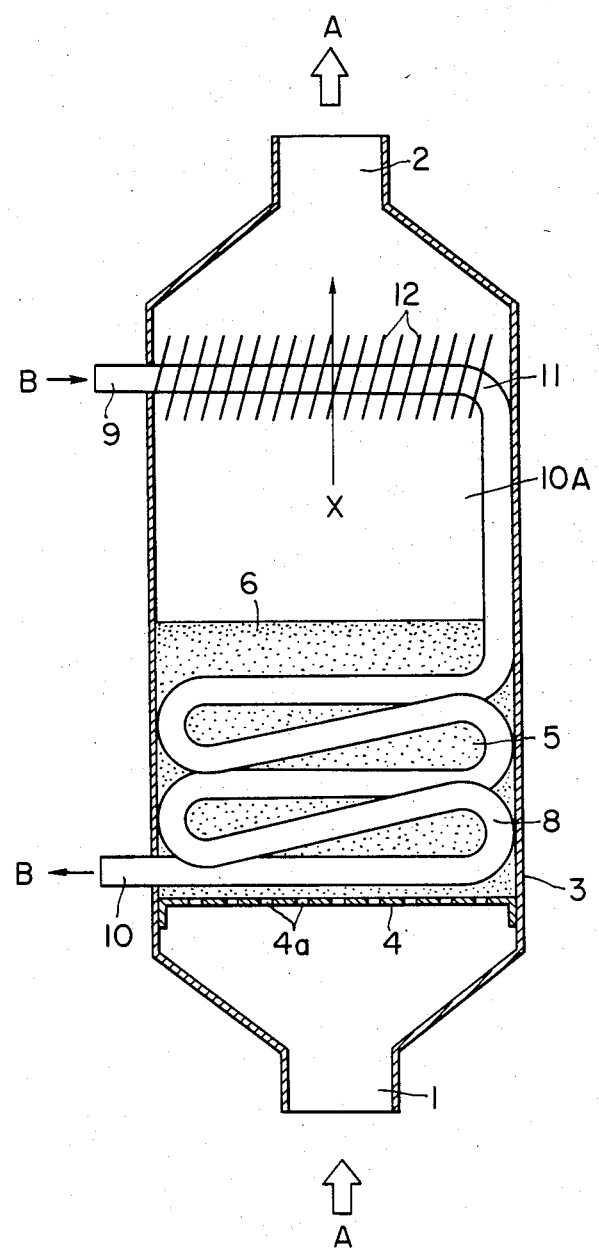
FIG. 4 is a longitudinal sectional view showing a modified heat exchanger according to this invention.
Figure 5:
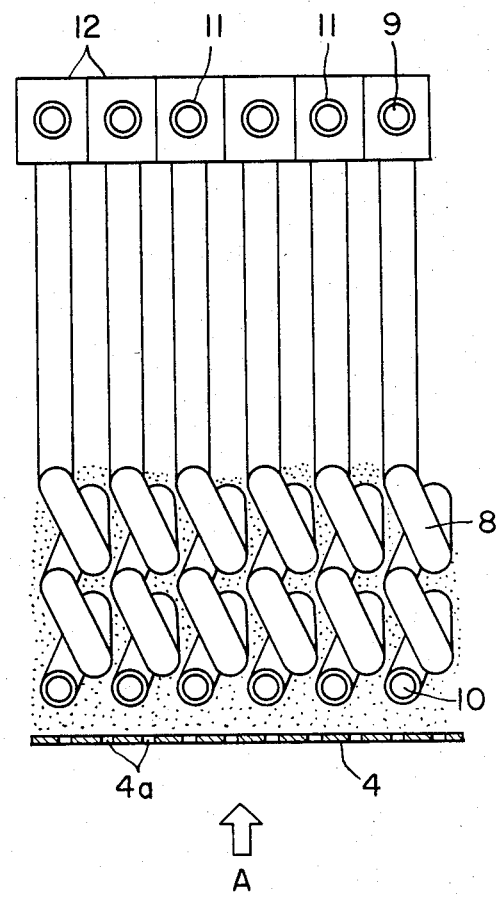
FIG. 5 is a longitudinal sectional view of the heat exchanger shown in FIG. 4, taken at right angles with respect to the sheet of drawing showing FIG. 4.

In a modification shown in FIGS. 4 and 5, a plurality of vertical serpentine pipes are juxtaposed in parallel. As shown, the lower portion of each heat transfer pipe 8 embedded in the fluidized bed 6 is bent many times such that when viewed from above some portions are located behind other portions. More particularly, starting from the lower side as seen in FIG. 4, the pipe 8 extends horizontally, bends up at the right-hand end, slopes downwardly toward left, bends upwardly, extends horizontally toward right and so on so as to form the complicated configuration as shown in FIG. 5.

As shown in FIG. 5, horizontal portions of each heat transfer pipe are offset in the horizontal direction so as to increase disturbances of the liquid and particles. By closely locating adjacent heat transfer pipes and increasing the number of bends, the hot gas passing through the perforations of the distributing plate 4 and the particles 5 collide many times against the heat transfer pipes thus providing advantageous effects similar to the embodiment shown in FIG. 3.

In the embodiment shown in FIGS. 4 and 5, each heat transfer pipe 8 has a substantially horizontal portion 11 located in a vacant space 10A above the fluidized bed 6. This portion is provided with a plurality of fins 12 made of copper or aluminum, for example. The number and inclination angle of the fins are determined such that, the hot gas or liquid and particles 5 do not flow straightforwardly to the exit port 2, that is in the direction of arrow X, or in the axial direction of the casing 3. With this construction of the fins, particles 5 blown upwardly from the bed 6 necessarily collide against the fins and fall down back to the bed 6. As a consequence, escape of the particles 5 to the outside of the heat exchanger can be positively prevented, thus making it unnecessary to frequently replenish the particles.

Figure 6:
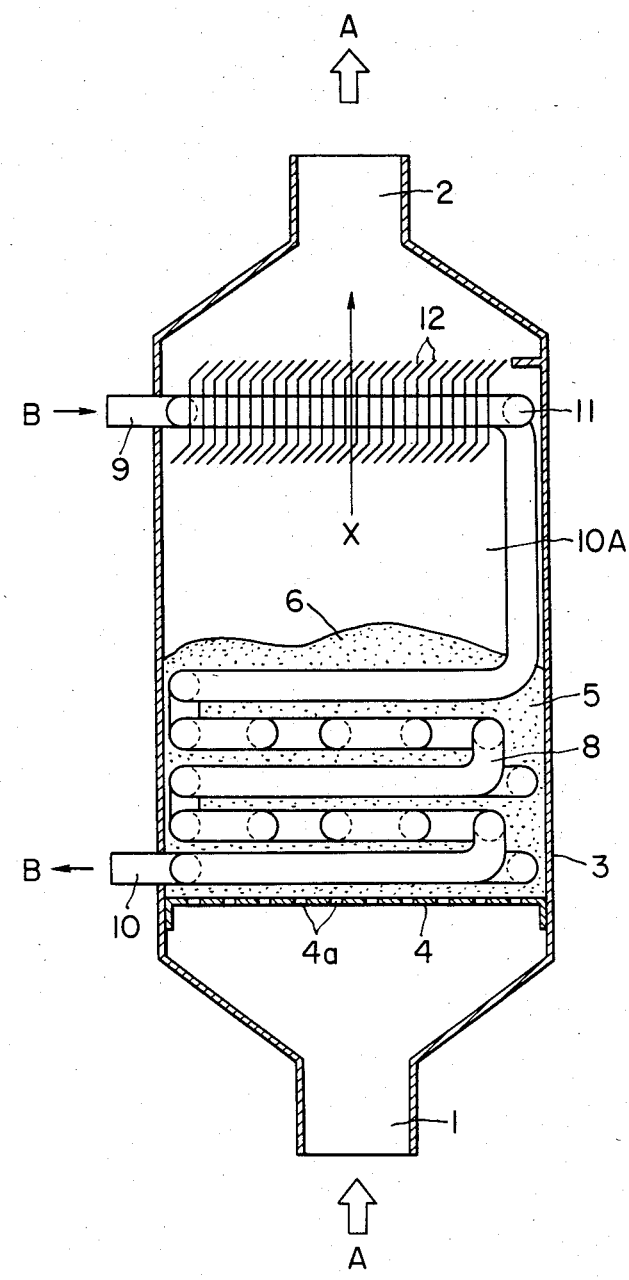
FIG. 6 is a vertical sectional view showing another modification of the heat exchanger.
Figure 7:
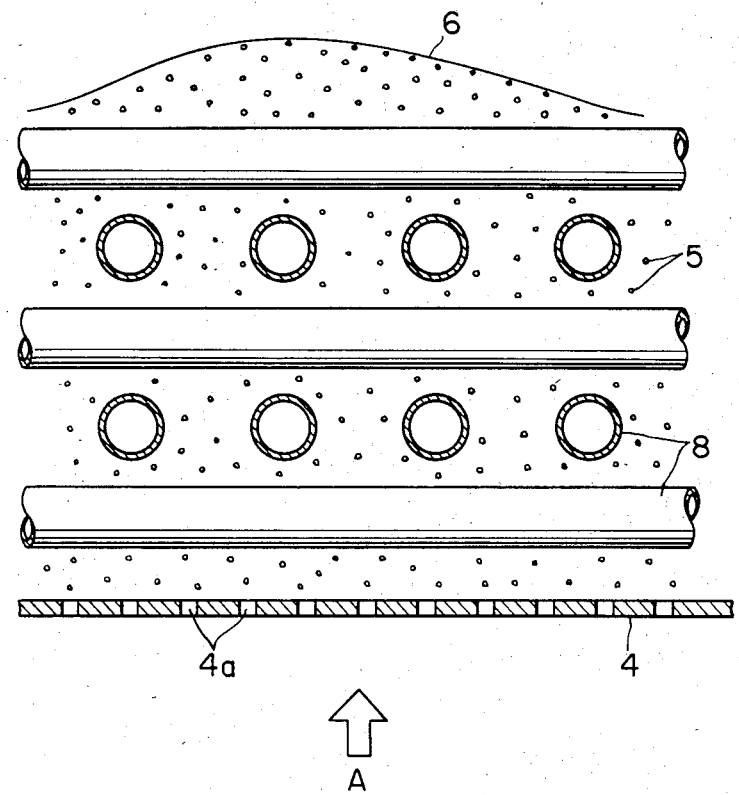
FIG. 7 is a vertical sectional view taken at right angles with respect to the sheet of drawing shown in FIG. 6.

In still another modification of this invention shown in FIGS. 6 and 7 the exchanger comprises four superposed stages of the heat transfer pipe 7 each extending in the horizontal direction. However, the pipe of alternate stages is bent into a serpentine form in a direction perpendicular to the sheet of drawing containing FIG. 6. Consequently, pipes of respective stages cross at right angles as shown in FIG. 7 and the hot gas or liquid and particles move in the vertical, horizontal and fore and aft directions, thus increasing heat transfer and avoiding formation of large gas bubbles.

In FIG. 6 when pipe 8 of the second and fourth stages is staggered in the vertical direction, the turbulent flow of the liquid or gas and the particles can be enhanced.

A portion 11 of the pipe 7 extending in the horizontal direction in the vacant space 10A above the fluidized bed 6 is also provided with a plurality of fins 12 for preventing escape of the particles 5. In this case, each fin comprises a vertical section secured to the pipe portion 11 and two outer sections inclining in the opposite directions. Such fins can remove particles more efficiently than those shown in FIG. 4.

Figure 8:
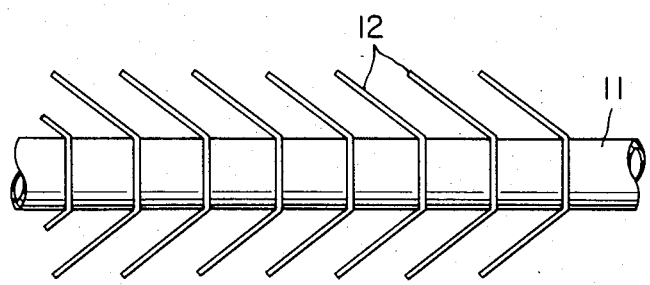
FIG. 8 is a perspective view showing modified fins.

FIG. 8 illustrates another example of the fins 12. In this example, each fin comprises a central section secured to the pipe portion 11 and two outside sections inclining in the same direction so as to define shallow U-shaped passages between the fins. So long as the fins can efficiently remove particles, any configuration and number of fins may be used.

In the foregoing description, it is stated that fluid entering into the inlet port 1 comprises hot gas or liquid, but it may also be cold fluid utilized to cool another fluid flowing through the heat transfer pipe.

I claim:

1. A heat exchanger comprising
a vertical casing having a lower fluid inlet port and an upper fluid exit port,
a fluidized bed formed on a perforated distribution plate positioned in said casing above said inlet port, and
a serpentine heat transfer pipe means embedded in said fluidized bed, and traversed by another fluid to be heated or cooled by said first mentioned fluid,
said heat transfer pipe means having a construction such that said first mentioned fluid and particles of said fluidized bed do not move straightforwardly from said inlet port toward said exit port, and said heat transfer pipe means comprising a horizontal portion connected in series with a portion thereof embedded in said fluidized bed and extending through a vacant space in said vertical casing above said fluidized bed, said horizontal portion being provided with a plurality of spaced inclined fins which overlap with each other when viewed from above.

2. The heat exchanger according to claim 1 wherein said heat transfer pipe means is provided with a plurality of parallel vertical fins and each fin is formed with inclined members alternately inclined in the opposite directions, inclined members of adjacent fins overlapping in the vertical direction.

3. The heat exchanger according to claim 2 wherein said inclined members are stamped out from respective fins thus forming perforations therethrough.

4. The heat exchanger according to claim 1 wherein a plurality of vertical heat transfer pipe means are juxtaposed in the horizontal direction and wherein each heat transfer pipe means comprises a plurality of offset horizontal sections embedded in said fluidized bed and a plurality of curved sections and inclined sections interconnecting said horizontal sections to form a continuous flow passage for said another fluid.

5. The heat exchanger according to claim 1 wherein said heat transfer pipe means comprises a plurality of vertically spaced horizontal stages and the pipe of alternate stages is bent into a serpentine shape substantially at right angles with respect to the pipe of other stages.

* * * * *